Sept. 12, 1939. D. W. MOLINS 2,172,804
MANUFACTURE OF CIGARETTES
Filed Dec. 7, 1936 11 Sheets-Sheet 1

Sept. 12, 1939.  D. W. MOLINS  2,172,804
MANUFACTURE OF CIGARETTES
Filed Dec. 7, 1936  11 Sheets-Sheet 3

Sept. 12, 1939.　　　　D. W. MOLINS　　　2,172,804
MANUFACTURE OF CIGARETTES
Filed Dec. 7, 1936　　　11 Sheets-Sheet 4

Inventor
D. W. Molins

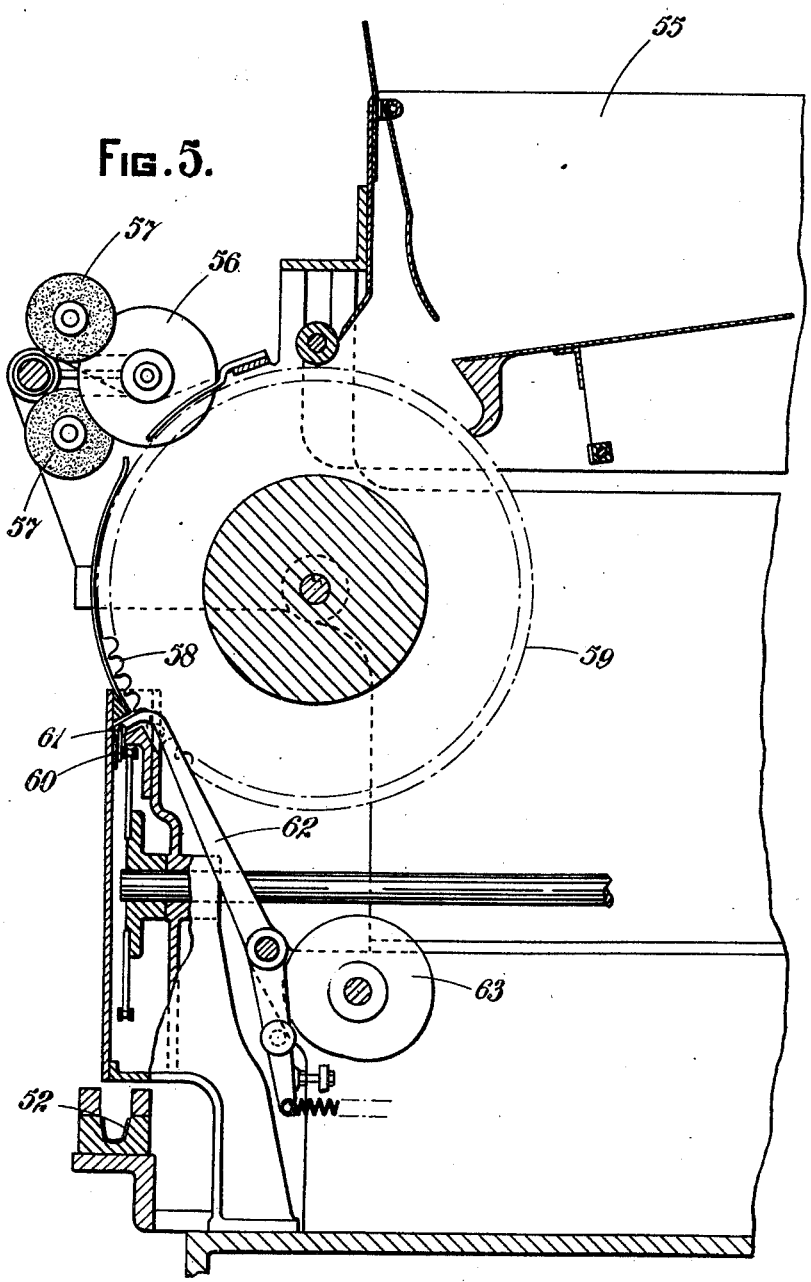

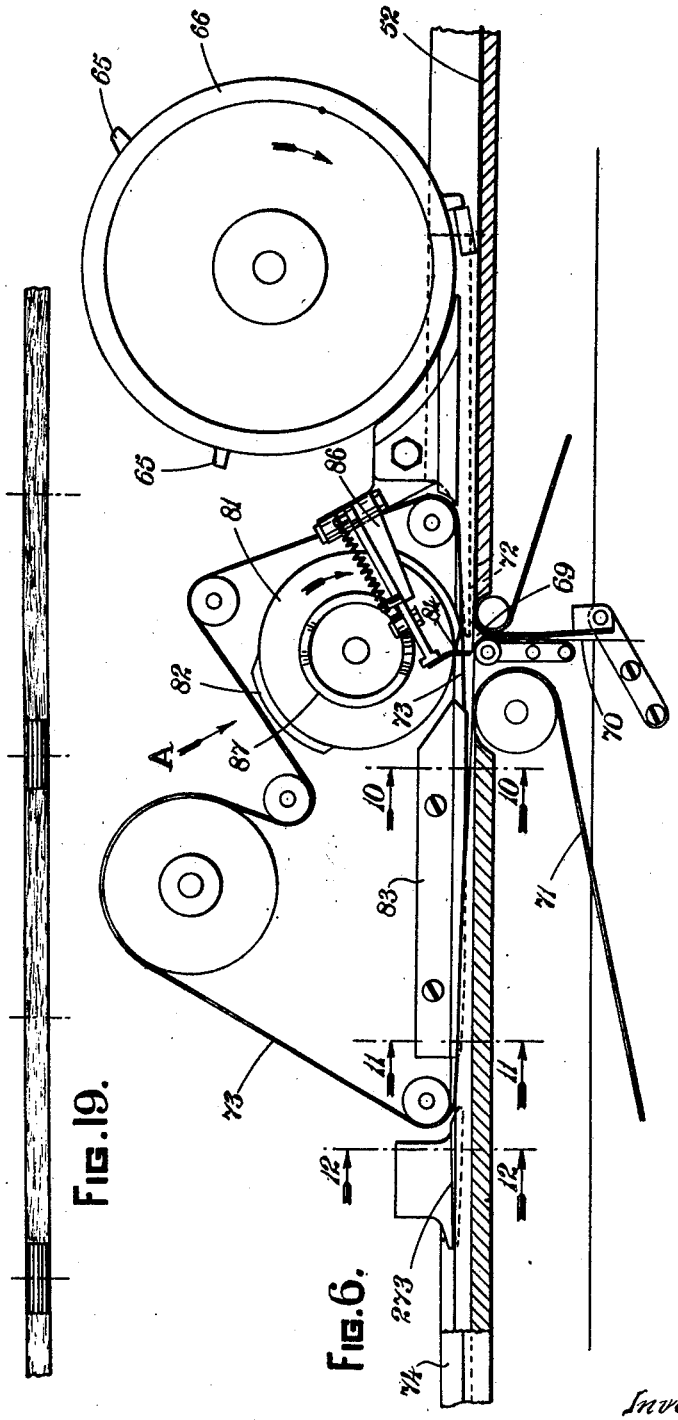

Sept. 12, 1939.　　　　D. W. MOLINS　　　　2,172,804
MANUFACTURE OF CIGARETTES
Filed Dec. 7, 1936　　　11 Sheets-Sheet 7

Inventor
D. W. Molins
By Watson, Coit, Morse
& Grindle　Attys.

Sept. 12, 1939. D. W. MOLINS 2,172,804
MANUFACTURE OF CIGARETTES
Filed Dec. 7, 1936 11 Sheets-Sheet 8

Inventor
D. W. Molins
By Watson, Coit, Morse
& Grindle ATTYS.

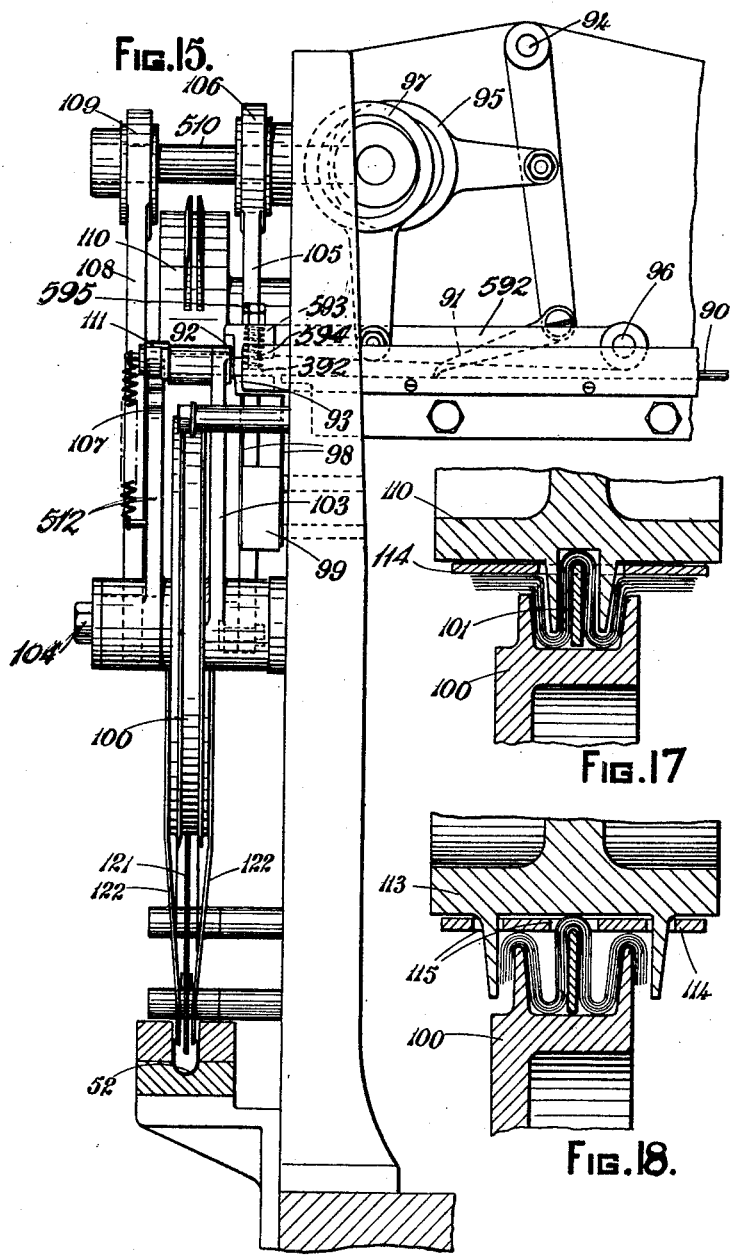

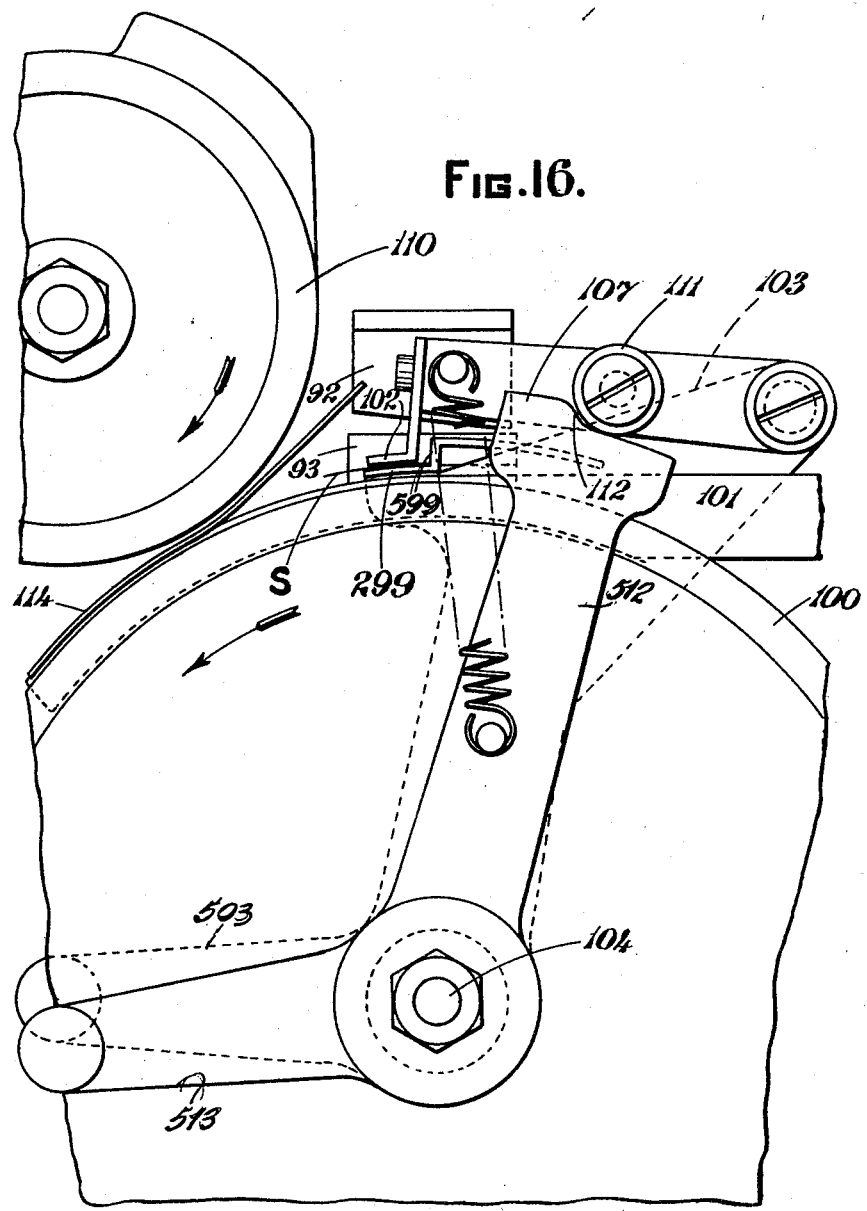

Sept. 12, 1939.                D. W. MOLINS                2,172,804
                        MANUFACTURE OF CIGARETTES
                        Filed Dec. 7, 1936        11 Sheets-Sheet 11
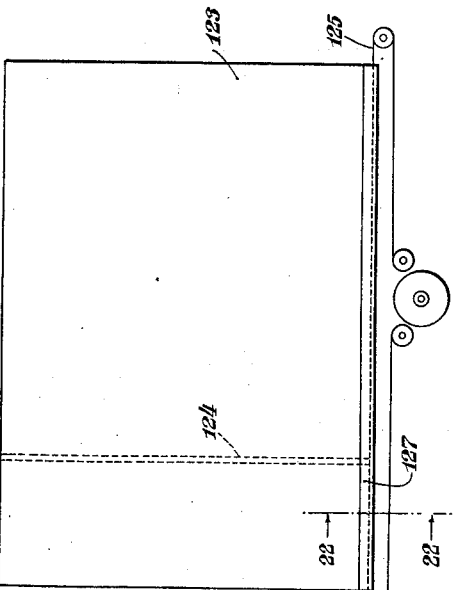
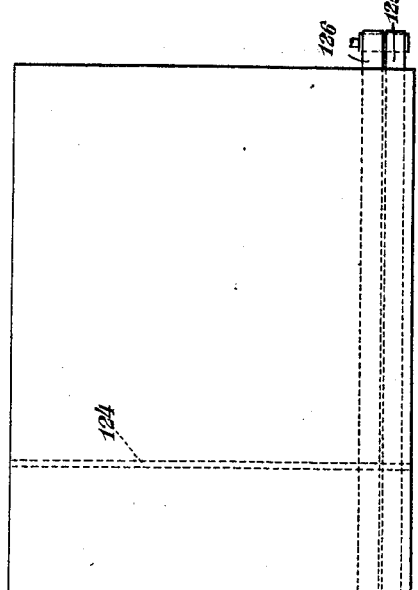
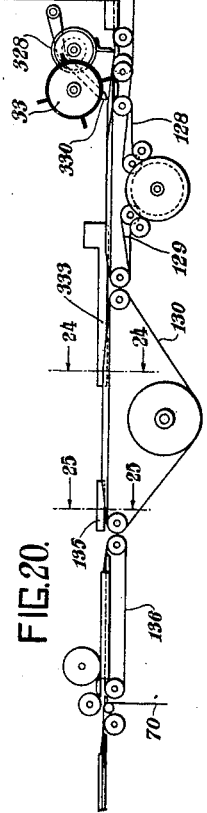
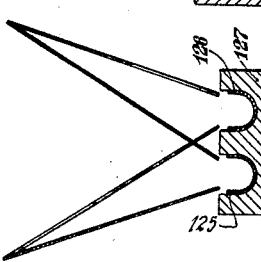
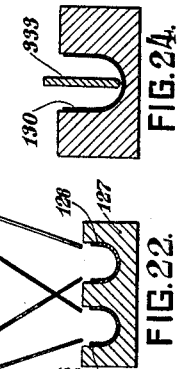
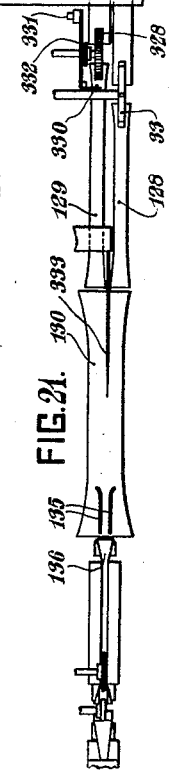

UNITED STATES PATENT OFFICE 2,172,804

MANUFACTURE OF CIGARETTES

Desmond Walter Molins, Deptford, London, England, assignor to Molins Machine Company, Limited, London, England Application December 7, 1936, Serial No. 114,694
In Great Britain December 21, 1935

21 Claims. (Cl. 131—39)

This invention is for improvements in or relating to the manufacture of cigarettes of the kind which will be hereinafter referred to as "mouthpiece cigarettes". One form of mouthpiece cigarette is provided at one end of the cigarette with a stub which acts as a filtering medium for the smoke from the tobacco. The stubs may comprise layers of bunched, folded or spirally wound crepe or other paper with or without intervening layers of absorbent paper or other material. In another form of mouthpiece cigarette, tubular mouthpieces are provided, and these tubes may be either hollow or filled partially or completely with filtering, flavouring or other material, for example, the tubes may be partly filled with filtering material and partly with tobacco. In the case where the tubes are hollow, the tubes should be formed from material which is sufficiently rigid to prevent a tendency to collapse during smoking.

In a still further form of mouthpiece cigarette the mouthpiece may comprise a different kind of tobacco from that forming the body or greater portion of the cigarette.

Where the words "mouthpiece portions" are used in the specification they shall, where the context renders it possible, include all articles or material (e. g., articles such as those specified above) which are positioned at the mouthpiece end of the cigarette.

It has been proposed previously to make mouthpiece cigarettes by feeding alternate sections of unwrapped tobacco and mouthpiece portions along the bed of a continuous rod cigarette making machine and to enclose the sections in a continuous tubular wrapper which is thereafter cut into suitable lengths. In all these prior arrangements the mass of the tobacco portions is at all times the same as the mass of the tobacco in the final cigarette. The term "mass" where used herein means the weight per unit length of the tobacco considered in the direction of movement thereof, and the term "desired mass" when used herein shall mean the mass which it is desired that the body portion of the mouthpiece cigarette shall have.

According to the present invention there is provided a method of manufacturing a continuous composite filler rod comprising alternate tobacco sections and mouthpiece portions which rod is to be wrapped in a continuous wrapper and severed to form mouthpiece cigarettes, said method comprising feeding lengths of unwrapped tobacco and mouthpiece portions and reducing the speed of movement of the tobacco and the mouthpiece portions within a confining passage in such a manner that there is produced an axial compression which causes the tobacco portion to build up to the walls of the confining passage.

Further, according to the present invention there is provided a method of manufacturing a continuous composite filler rod comprising alternate tobacco sections and mouthpiece portions which rod is to be wrapped in a continuous wrapper and severed to form mouthpiece cigarettes, said method comprising feeding forwardly into one end of and through a confining passage mouthpiece portions and lengths of unwrapped tobacco which lengths of tobacco at all points or substantially all points are below the desired mass, and removing the tobacco and mouthpiece portions from the opposite end of the confining passage at a slower speed, in such a manner that the reduction in speed in the confining passage causes the unwrapped tobacco to build up to the walls of the confining passage and thereby increase its mass.

Further, according to the present invention there is provided an arrangement for manufacturing a continuous composite filler rod comprising alternate tobacco sections and mouthpiece portions, which rod is to be wrapped and severed to form mouthpiece cigarettes, by means of a continuously movable conveyor device for moving the tobacco sections and mouthpiece portions forwardly and means to feed the alternate tobacco sections and mouthpiece portions in the same general direction as and towards said conveyor device, but at a speed higher than that at which the conveyor device moves the tobacco sections and mouthpiece portions forwardly and control means to confine the tobacco sections within the desired cross-sectional size at or in the region of the point at which the speed of the tobacco sections and mouthpiece portions changes so as to produce a change in momentum of the tobacco sections and mouthpiece portions for the purpose of compacting the tobacco sections to the desired extent and reducing spaces between the tobacco sections and the mouthpiece portions.

The invention will be described by way of example with reference to the accompanying drawings in which:

Figure 5 is an end elevation partly in section of Figure 4.

Figure 6 shows a detail drawn to an enlarged scale of Figure 1A.

Figure 10:
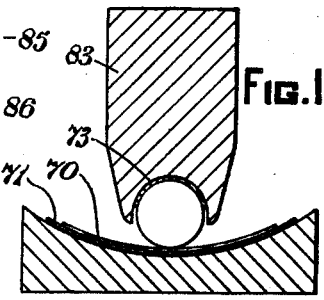
Figure 8:
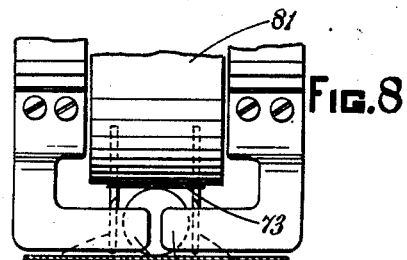
Figure 8 is an elevation of Figure 7, and is drawn to an enlarged scale.
Figure 11:
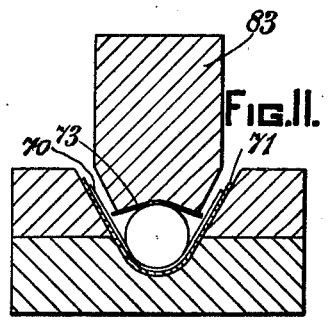
Figure 12:
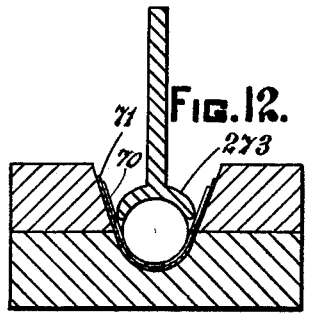

Figures 10, 11 and 12 are sections drawn to an enlarged scale and taken on the lines 10—10, 11—11 and 12—12 respectively of Figure 6.

Figure 13:
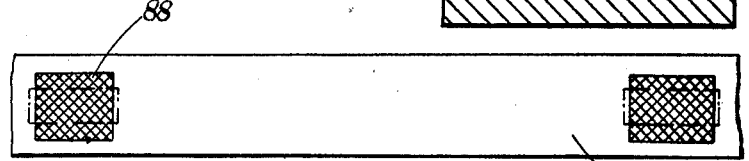

Figure 13 shows a portion of a continuous web of wrapping material having adhesive applied thereto at the positions at which the stub are to be located.

Figure 4:
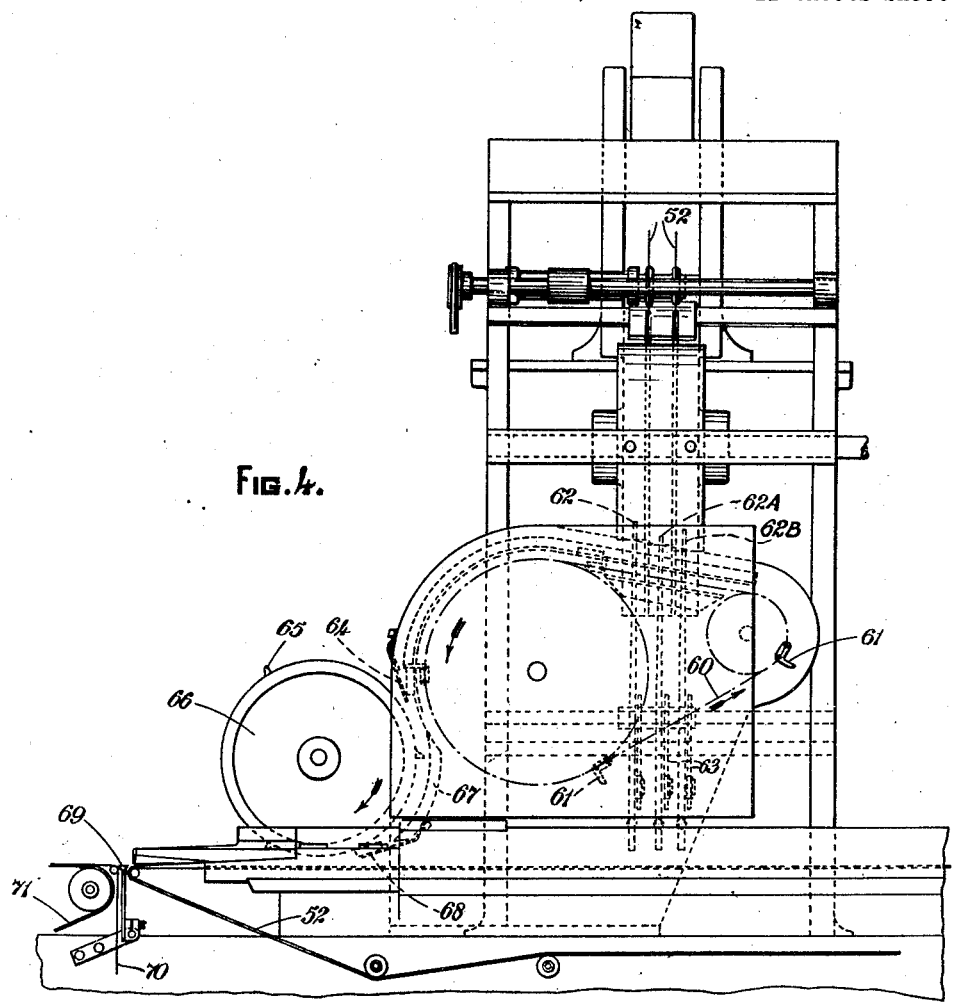
Figure 4 is a detail showing stub feeding mechanism.
Figure 14:
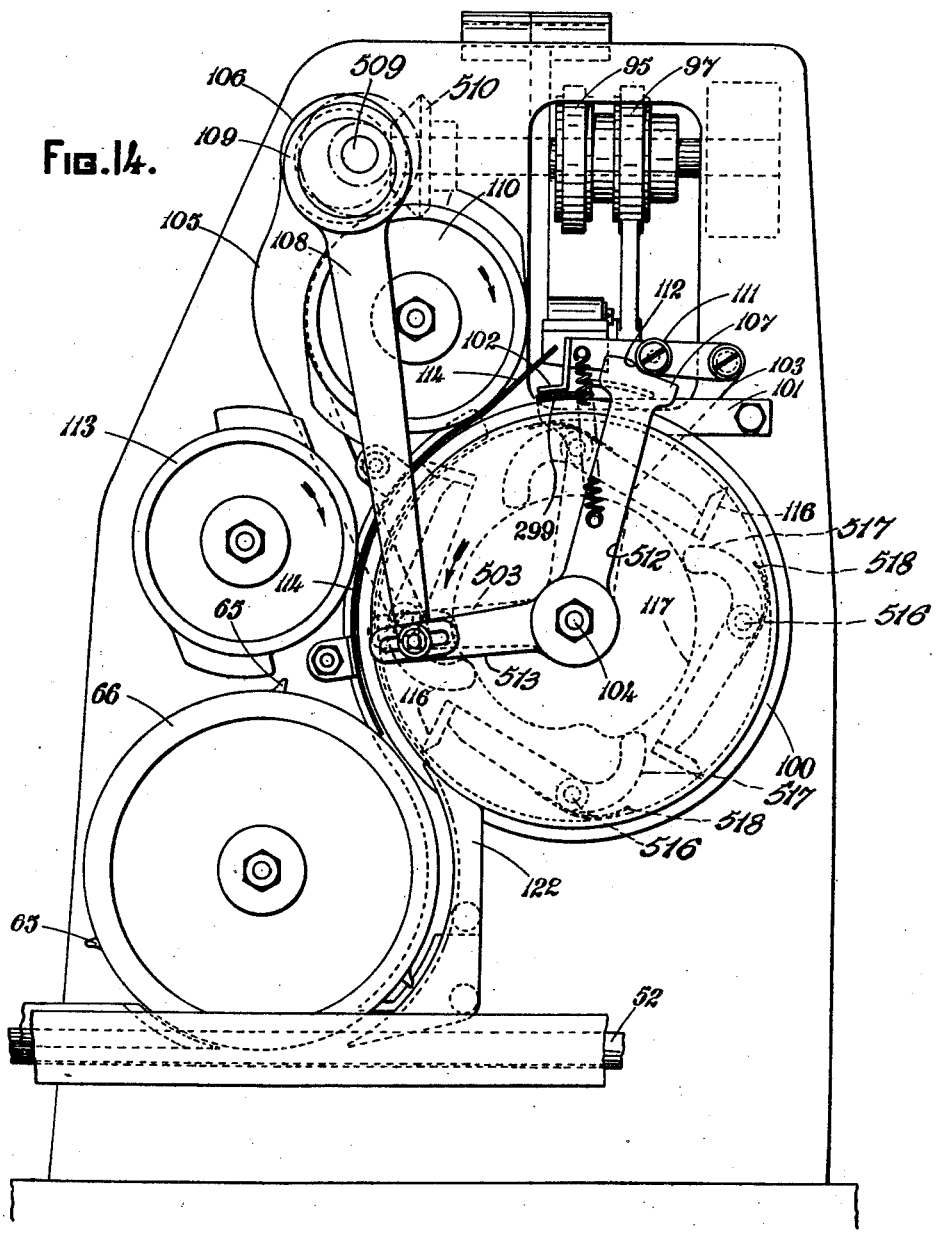

Figure 14 is a side elevation of an apparatus which may be arranged to replace the stub feeding mechanism shown in Figures 4 and 5.

Figure 15 is an end elevation of Figure 14.

Figure 16 shows a part of Figure 14 drawn to an enlarged scale.

Figures 17 and 18 are sections drawn to an enlarged scale, and showing the method by which the filter material is folded by the mechanism shown in Figures 14 and 15.

Figure 1:
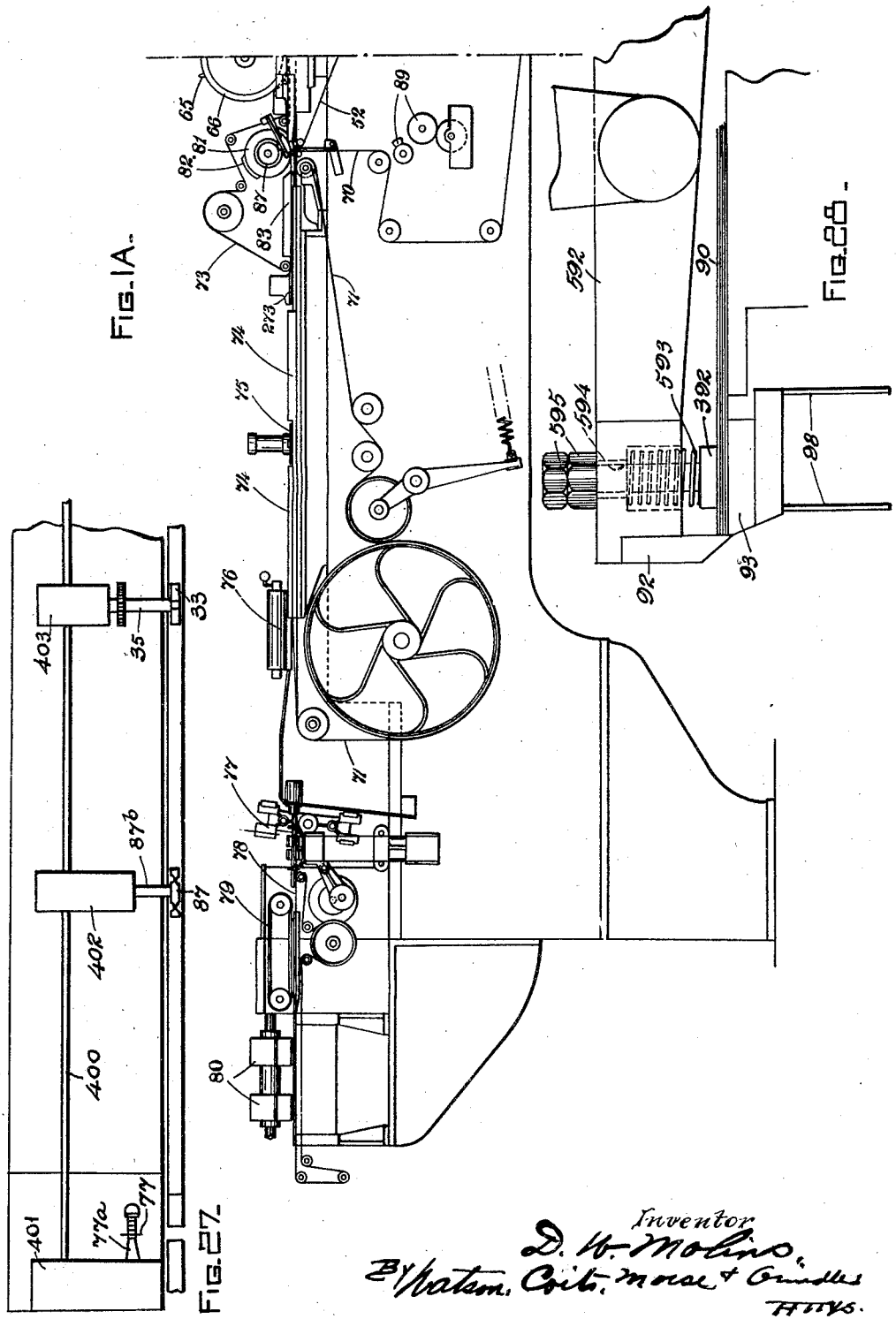
Figures 1A and 1B show a side elevation of a machine for manufacturing mouthpiece cigarettes.

Figure 19 shows, in section, a continuous composite rod formed by the machine shown in Figures 1A and 1B.

Figure 20 is a diagrammatic side elevation of a part of a modified form of machine for forming mouthpiece cigarettes.

Figure 21 is a plan of Figure 20.

Figure 22 is a section drawn to an enlarged scale and taken on the line 22—22 of Figure 20.

Figure 23:
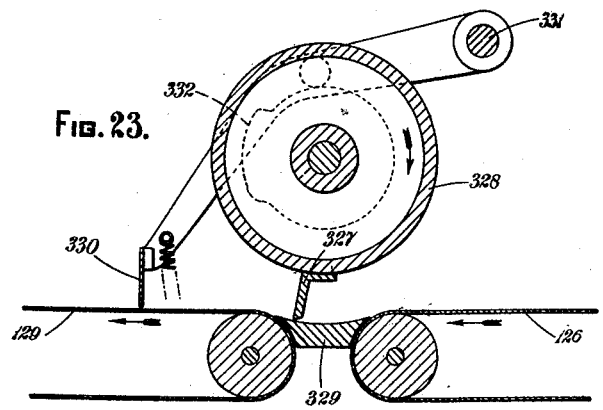
Figure 7:
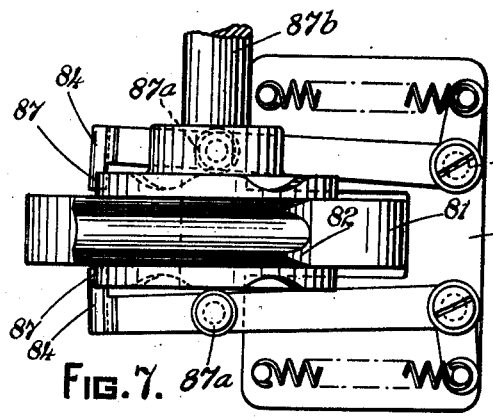
Figure 7 is a plan of a part of Figure 6, the view being taken in the direction of the arrow "A".

Figure 23 shows a part of Figure 20 drawn to an enlarged scale.

Figure 24 is a section drawn to an enlarged scale and taken on the line 24—24 of Figure 20.

Figure 25 is a section drawn to an enlarged scale and taken on line 25—25, Figure 20.

Figure 26 illustrates, in section, a composite rod formed by the machine shown in Figure 20.

Figure 27 is a diagrammatic plan view of a portion of the machine showing the driving connections for operating certain parts of the machine in timed relation; and Figure 28 is an elevational view showing an enlarged fragmentary portion of Figure 15.

Like references refer to like parts throughout the specification and drawings.

Figure 2:
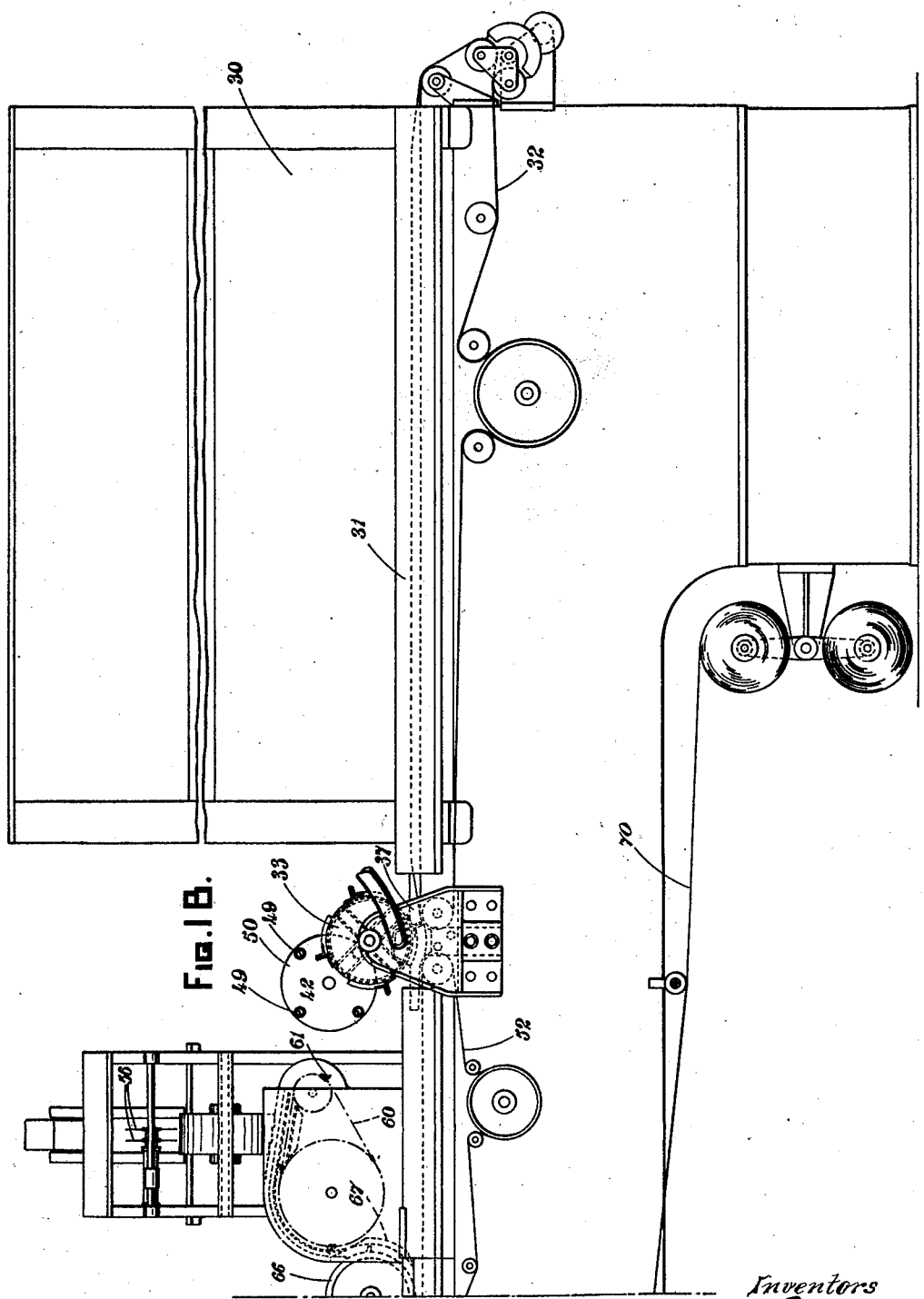
Figure 2 shows in section a detail drawn to an enlarged scale of Figure 1B.
Figure 3:
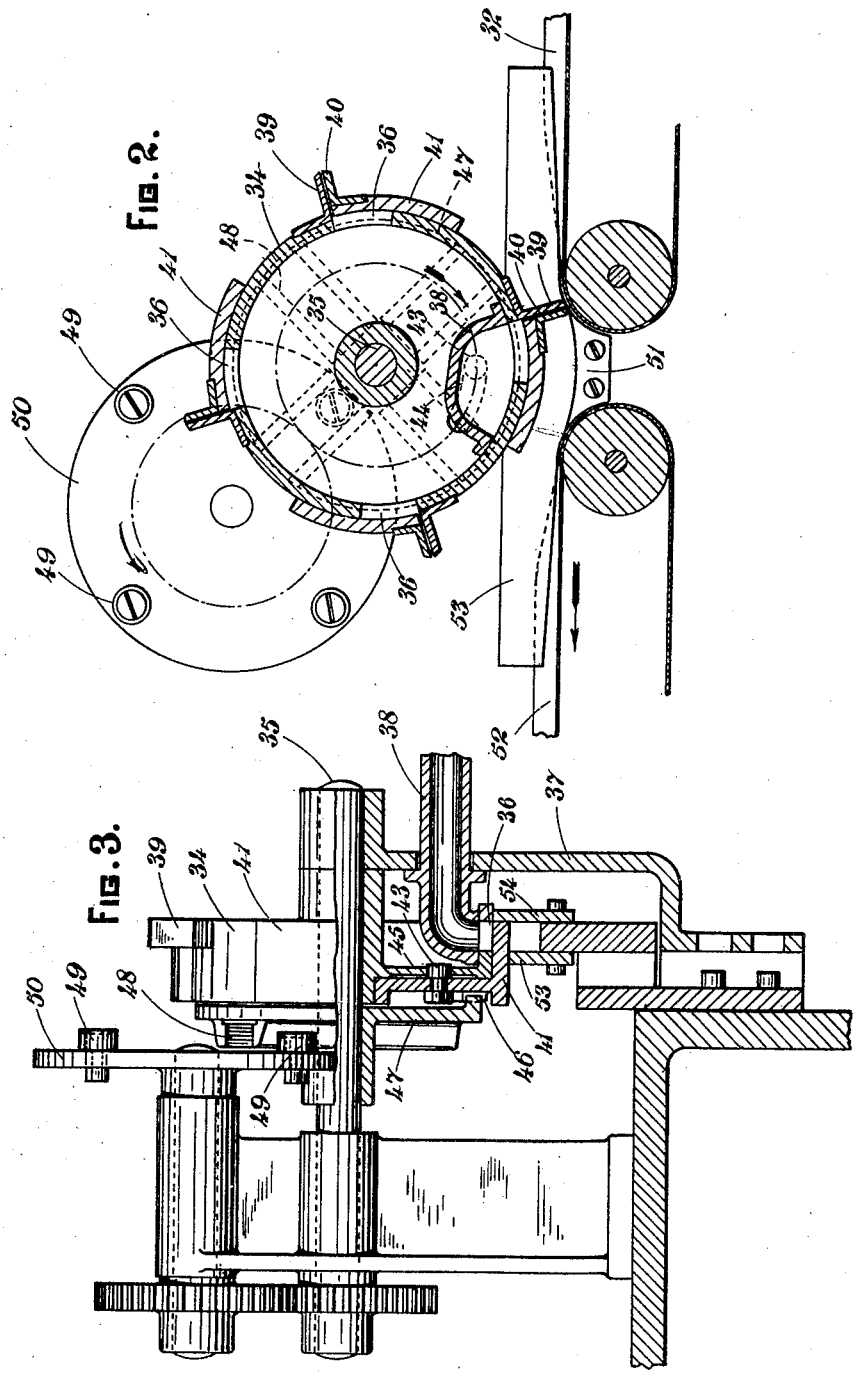
Figure 3 is an end elevation partly in section of Figure 2.

Referring to the drawings, tobacco is fed by any suitable known form of tobacco feeding mechanism illustrated diagrammatically at 30 into a trough 31, through which tobacco feeding means shown as an endless band 32 is continuously moved. The tobacco feeding means 32 moves the stream of tobacco which is deposited thereon forwardly towards separating means indicated generally in Figure 1B by the reference 33. Referring to Figures 2 and 3, the separating means comprises a rotatable hollow drum 34 secured to a shaft 35 for rotation therewith, and the periphery of the drum is provided with apertures 36 which communicate with the hollow interior of the drum. A bracket 37 supports a suction chamber 38, which is arranged within the hollow drum 34 in a manner such that it remains stationary in the position shown in Figures 2 and 3.

The drum 34 is rotated continuously by the main drive of the machine and in timed relation with cutting mechanism to be referred to below. At intervals around the periphery of the drum 34 there are arranged pairs of separating elements, each pair comprising an element 39 and an element 40. For ease in description only one pair of elements will be hereinafter referred to, it being understood that the operation of each pair of elements is the same as that about to be described.

The element 39 is fixed to the periphery of the drum 34, whilst the element 40 is formed as a knife and is carried by a sleeve element 41, which is arranged to oscillate on the periphery of the drum 34. The sleeve element 41 moves with the drum 34, and at the same speed as the drum, except during the period in which the tobacco is being divided into sections with gaps between the sections, during which time the sleeve element 41 is moved relatively to the drum 34, the added movement being imparted to the sleeve element 41 by a Geneva drive indicated generally in Figure 1B by the reference 42.

As can be seen from Figures 2 and 3, the sleeve elements 41 are arranged around the periphery of the drum 34, and are connected therewith by a pin 43 which engages with a slot 44 formed in a web 45, connecting the outer rim of the drum 34 with the hub thereof by means of which the drum is secured to the shaft 35. The sleeve elements 41 are connected with each other, and a projection 46 carried by a disc 47 is arranged to engage with that sleeve element which is connected by the pin 43 to the drum 34, so that when the pin 43 moves in the slot 44 each of the elements 40 is moved relatively to the drum 34 and to the elements 39. The disc 47 is provided with grooves 48, and rollers 49 carried by a disc 50 are arranged to co-operate with the grooves 48 and to impart to the elements 41 their movement relative to the drum 34. The disc 50 is rotated by gearing driven from the main drive of the machine.

As the tobacco is moved forwardly by the tobacco feeding means 32, it passes over a bridge 51, and is transferred to a second tobacco feeding means shown as an endless conveyor band 52. The co-operating elements 39 and 40 are arranged to project into the tobacco as it is transferred from the tobacco feeding means 32 and moved across the bridge 51, the element 39 preventing the tobacco from falling into the gap which is being formed by the element 40. The element 40 when it projects into the tobacco cuts the tobacco shreds against the bridge piece 51, and the Geneva movement then operates to move the sleeve element 41 relatively to the drum 34, so that the tobacco which is in front of the element 40 is moved forwardly by that element, thereby causing a space to be formed between the elements 39 and 40. The elements 39 and 40 maintain control of the spacing of the tobacco sections until the sections are delivered on to the second tobacco feeding means 52. Whilst the tobacco is being divided into sections by the elements 39 and 40 it is controlled laterally by side guides 53 and 54.

It will be seen from the drawings that the apertures 36 forming the periphery of the hollow drum 34 are normally closed by the sleeve elements 41. When, however, a sleeve element is moved relatively to the drum 34 the aperture covered by the sleeve element is uncovered, and as can be seen clearly from Figure 2 the aperture is uncovered as the tobacco is being divided. Suction provided by any suitable device, such for example, as a fan, is connected with the suction chamber 38, and it will be observed that the aperture 36 is facing the suction chamber whilst the aperture is uncovered. By this means shreds of tobacco which may be left between the elements 39 and 40 after the tobacco has been divided are removed by the suction, so that when the tobacco sections are delivered on to the second tobacco feeding means 52 the spaces between successive sections of tobacco are clean. The second tobacco feeding means 52 moves at a faster speed than that of the first tobacco feeding means 32 so that the tobacco portions are spread on the second tobacco feeding means 52 in a manner such that their mass is at all points or at substantially all points below the desired mass, and the spaces between the successive tobacco sections are accentuated.

The tobacco sections are carried by the second tobacco feeding means 52 beneath a device arranged to deposit mouthpiece portions into the spaces between successive tobacco sections. Figures 4 and 5 show a device for depositing the mouthpiece portions into the spaces just referred to. The spaces between successive tobacco sections are each of a length which is greater than the length of a mouthpiece portion suitable for two finished cigarettes, whilst the quantity of tobacco in each section is sufficient for two finished cigarettes. Into a hopper 55 there is placed a quantity of lengths of filter material, each formed to the desired cross section and contained in a tubular wrapper. Each length of filter material is a length sufficient for six individual cigarettes, and the lengths are severed into three double length mouthpiece portions by means of knives 56. The knives 56 are sharpened by means of grinding elements 57. The lengths of filter material are removed from the hopper 55 by the flutes 58 of a rotatable drum 59, and the filter material is contained in the flutes 58 whilst they are being cut into lengths by the knives 56.

After the lengths of filter material have been cut into three they are carried by the flutes 58 to a position at which they are engaged by oscillating arms arranged to remove the mouthpiece portions from the flutes 58 and to insert them one at a time into the path of a conveyor 60 having pusher pieces 61. Three oscillating arms 62, 62A and 62B are provided, each arm being arranged to engage one of three aligned mouthpiece portions contained in a flute 58 and the arms are operated by cams 63 and moved in timed relation with each other, so that each of the three mouthpiece portions contained in a flute 58 is delivered one after the other into the path of a pusher piece 61. The sequence in which the three mouthpiece portions are delivered into the path of the pusher piece 61 may be that sequence which is suitable for any particular construction, thus, for example, the mouthpiece portion which is positioned before the arm 62 in Figure 4 may be first delivered into the path of a pusher 61, that mouthpiece portion which is before the arm 62A next, and the mouthpiece portion before the arm 62B may be the last to be positioned in the path of a pusher 61. The pusher 61 engages with a mouthpiece portion and carries it in the direction indicated in Figure 4, but it will be seen that the pusher 61 will for a period, whilst the mouthpiece portion is travelling downwardly, lose control of the mouthpiece portion. The mouthpiece portion leaves the control of the pusher 61 and falls downwardly between guides until it is arrested by a spring 64, positioned in the path of the mouthpiece portion. The pusher 61 then again engages with the mouthpiece portion and pushes it past the spring 64 and into the path of a projection 65 carried by a rotatable wheel 66. The path through which a mouthpiece portion moves whilst it is capable of being engaged by a projection 65 is determined by lateral guides, and a shrouding element 67. When the mouthpiece portion is released from the control of the spring 64 it again moves downwardly until its progress is arrested by a further spring 68, and whilst it is arrested by the spring 68 the mouthpiece portion is engaged by the projection 65 which moves the mouthpiece portion out of the control of the spring 68, and deposits it upon the surface of the band 52, and into the space between two successive tobacco sections.

The wheel 66 is so arranged that if the tobacco on the second tobacco feeding means 52 is sufficiently high it will be compressed by the wheel 66. The tobacco sections, together with the mouthpiece portions, are then transferred from the tobacco feeding means 52 and are moved across a bridge piece 69 and delivered to a conveyor device comprising the surface of a continuous web 70 of paper, which is being continuously moved by an endless conveyor band 71. The speed at which the tobacco feeding means 52 is moving is greater than the speed at which the paper web 70 and band 71 are moving, so that as the tobacco sections are transferred from the tobacco feeding means 52 to the paper web 70 the momentum of the tobacco sections is changed and the tobacco is caused to build up in a confining passage, so that the tobacco sections acquire substantially the desired mass. The confining passage is formed by side guides 72, the surfaces of the tobacco feeding means 52 and the conveyor band 71, together with the bridge piece 69 and an endless tape or band 73. The endless tape 73 is movable as shown in Figure 6, so that that surface of the tape which is adjacent the surfaces of the tobacco feeding means 52 and conveyor band 71 by which the tobacco sections are carried is moving in the same direction as the direction in which the tobacco feeding means 52 and conveyor band 71 are moving, and the speed of movement of the band 73 is the same as that of the conveyor band 71.

When the tobacco is fed into the confining passage by the tobacco feeding means 52 it is as previously stated at all points, or at substantially all points, below the mass which it is desired that the tobacco shall have in the finished cigarette, and as the momentum of the tobacco sections is changed the tobacco builds up in the confining passage until it has acquired substantially the mass which it is desired that the finished cigarette shall have. The composite filler rod is then removed from the confining passage by the band 71 and is passed, together with the paper web 70 beneath a tongue 273 through folding mechanism of any suitable known construction shown generally in Figure 1A by reference 74, and past a pasting device 75 which secures the seam of the wrapper, and thereafter beneath a heating element 76 which dries the adhesive in the seam, after which the band 71 moves the continuous composite cigarette rod to cutting mechanism 77 of any suitable known construction, which severs the rod at the places indicated in chain lines in Figure 19. By reference to Figure 19 it will be seen that the continuous composite cigarette rod is severed through the mouthpiece portions and tobacco sections so that individual cigarettes are produced, each of which has at one end a tobacco section, and at the other end a mouthpiece portion. After the cigarette lengths have been severed from the continuous composite cigarette rod they are delivered on to a further endless band 78, which moves at a speed greater than the speed at which the continuous composite cigarette rod is moving, so that successive cigarettes are spaced apart from each other in an axial direction, and spring bands 79 co-operate with the band 78 to maintain the spacing of the cigarettes on the band 78. Deflecting elements 80 are arranged to deflect the cigarettes out of the rod line, and to deliver them on to a conveyor band in the well known manner, or to any other suitable receptacle.

Figure 9:
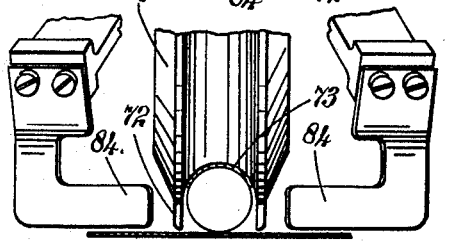
Figure 9 shows the parts illustrated in Figure 8 in a different position.

As can be seen from Figures 6, 9 and 10, the band 73 is of substantially U formation when it engages with the tobacco sections and mouthpiece portions, this arrangement being provided so as to ensure that when the mouthpiece portions are placed in position relatively to the cutting device 77 they are maintained in position whilst the tobacco sections and mouthpiece portions are transferred to the paper web 70. So as initially to form the band in a U the band 73 is engaged by a roller 81, having projections 82 formed on its periphery, the projections 82 being of substantially U form and arranged so that in effect they form a continuation of a U shape guide 83. To synchronize the mouthpiece portions with the cutting mechanism 77 there is provided a mouthpiece locating element comprising a pair of stops 84 which are pivoted at 85 to a bracket 86, and are provided with rollers 87a by means of which they are controlled by a cam 87 rotatable with the wheel 81. The cam 87 is rotated in timed relation with the cutting device 77, so that the stops 84 are moved into the path of the mouthpiece portions and engage the leading end faces of the mouthpiece portions, thus causing them momentarily to be arrested. The stops 84 are quickly moved out of the path of the mouthpiece portions after the latter have been located and as the mouthpiece portions again move forwardly they are gripped by the band 73 and held in position. In the event a tobacco section and a mouthpiece portion are not positioned in direct contact and abutting relation, the tobacco at the end of the tobacco section tends to fall downwardly and any gap between the sections is filled by this movement of the tobacco.

In order to ensure that in the finished cigarette the mouthpiece portion is secured to the wrapping material 70, the endless web 70 may be provided with areas 88 of adhesive, the adhesive areas 88 being applied to the web before the mouthpiece portions are delivered thereto. The adhesive is applied to the paper web by mechanism shown in Figure 1A and indicated generally by the reference 89. In Figure 13 a section of the web 70 is shown, together with the adhesive areas 88, and mouthpiece portions are indicated in chain line in this figure to show the position which they occupy relatively to the web.

Figure 27 is a diagrammatic plan view of a part of the machine shown in Figures 1A and 1B. In this figure the drive connections for operating certain parts of the machine in timed relationship are shown. The means shown here diagrammatically may of course be provided with any suitable detailed mechanism, which mechanism forms no especial part of the present invention. A main drive shaft 400 driven from any suitable source of power is operatively connected with the shaft 35 upon which the tobacco spacer member 33 is mounted. There is diagrammatically represented at 403 gearing for applying the appropriate speed change to the shaft 35 from the main driving shaft 400. The drive shaft 400 is operatively connected with the shaft 87b which rotates the cam wheel 87, which operates the retarding and spacing arms 84, by means of suitable proportioned gearing indicated at 402. Similarly, by means of gearing 401, the rotary cutter 77, driven by the shaft 77a, is operated from the main drive shaft 400.

The gearing 401, 402 and 403 are so selected and arranged that the cam 87, cut-off mechanism 77, and the device 33 are all driven in definite timed relationship from the common source of power. Obviously, wherever necessary or desirable, other operative units of the machine may be similarly synchronized.

In a modified form of machine above described, the mechanism for feeding mouthpieces into the spaces formed between successive tobacco sections is replaced by the mechanism shown in Figures 14 and 15. In this modified construction the mouthpiece portions are not preformed, but are partly formed by the mechanism shown in Figures 14 and 15, the formation of the mouthpiece portions being completed whilst the endless wrapper 70 is being wrapped about the composite filler rod. Referring to Figures 14, 15 and 16, a web 90 of filter material is fed from a reel, not shown, and is engaged by a feeding element 91 which feeds the web to cutting mechanism comprising knives 92 and 93. The feeding member 91 is pivoted at 94, and is operated by an eccentric strap 95. The web 90 comprises a plurality of layers of crepe paper interleaved with cellulosic material, and the material is, therefore, relatively thick, and the reel from which the web is fed does not last very long when the machine is in operation. In order to continue the operation of the machine for a longer period the web 90 is built up as it is fed to the knives 92 and 93, and in this arrangement a plurality of reels of material are arranged above one another, each reel feeding one layer of material to the web 90. Such a construction is well known in the art.

The knife 92 is pivoted at 96, and is oscillated by an eccentric strap 97. The knife 93 is supported by spring blades 98 secured to a block 99 forming a part of the frame of the machine. By this arrangement the springs 98 flex whilst a cutting action is being performed, and the knives 92 and 93 are thereby kept in co-acting relationship with each other and are self sharpened. The cutting action of the knives is similar to that of scissors and a gripper 392 is operative to grip the web whilst a strip is being severed therefrom by the knives 92 and 93.

The gripper 392 is connected to a stem 594 which is movable in a hollow frame in the support for the knife 92 and is controlled by a spring 593. The support for the knife 92 is secured to an arm 592 with which the eccentric 97 is connected and the gripper 392 is so arranged that on the downward movement of the arm 592 the gripper 392 engages the web 90 and presses it against the upper surface of the knife 93 before the knife 92 operates to sever a strip from the web. The continued downward movement of the arm 592 causes the spring 593 to be compressed and the web to be gripped between the gripper 392 and the upper surface of the knife 93. Locking nuts 595 hold the stem 594 in position.

The web of material is of a width which is equal to the length of a double length mouthpiece portion, and the knives 92 and 93 cut the web transversely so as to provide a strip that contains sufficient material to be folded up to form a double length mouthpiece portion of the desired cross section. The transverse strips severed from the web are delivered on to a carrier 299 which is movable in a path concentric with the periphery of a rotatable drum 100, and are moved thereby to mechanism which folds the material in a manner about to be described. The periphery of the drum is formed as shown in Figure 17, and a stationary control member 101 extends around the periphery of the drum 100, and the strip material is folded about the control member 101. In order to retain the strip material in position on the carrier 299 until the material is delivered onto the periphery of the drum 100, there is provided a gripper element 102 which is pivoted to an arm 103, the arm being in turn pivoted at 104 and operated by a link 105 connected with an eccentric 106. A cam 107, operated by a link 108 and eccentric 109, is moved with the gripper element 102 and is operative to move the gripper 102 so as to release the strip material when it is engaged by a rotatable folding element 110 co-operating with the periphery of the drum 100. As will be seen from Figure 16 the leading end portion S of the strip is fed so as to overlie the carrier 299. The upstanding part 599 of the carrier 299 engages the rear edge of the web almost simultaneously with the cutting of the strip from the web and the presser 102 at this instant is caused to descend thus causing the strip to be gripped between the carrier 299 and the presser 102 as shown in Figure 16. The projecting portion "S" is obtained due to the fact that the width of the web is greater than that of the carrier 299, thus when the rear edge of the web is located against the part 599 a part of the strip must project in front of the carrier 299. The end portion S is guided between the element 110 and the periphery of the roller 100 by a guide 114. The carrier 299 is supported by an arm 103 pivoted at 104 and an extension 503 of the arm 103 is connected by a link 105 with an eccentric 106. The cam 112 is formed at the end of an arm 512 which is also pivoted at 104 and an extension 513 of the arm 512 is connected by a link 108 with an eccentric 109. The eccentrics 106 and 109 are both mounted on a spindle 509. The spindle 509 is rotated by a bevel gear (not shown) which meshes with the bevel gear 510 mounted on the spindle supporting the eccentrics 95 and 97, this latter spindle being driven by any suitable connection from the main drive of the machine. The manner of operation of the cam 107 is that the cam is not moved for so great a distance as is the gripper element, so that the roller 111 carried by the gripper 102 rides up the surface 112 of the cam and so raises the gripper 102 out of engagement with the filter material.

The rotatable folding element 110 folds the strip material about the control member 101, so that the strip material assumes the form shown in Figure 17. The drum 100 then moves the filter material past a further rotatable folding element 113, which folds the material so that it assumes the form shown in Figure 18.

In order to keep the material in position after it has been folded by the element 110, the guide 114 is provided to shroud the periphery of the drum 100. The rotatable folding element 113 operates on the material through slots 115 formed in the guide 114.

After the gripper 102 has released the strip material the material is engaged by pushers 116 which are pivoted as at 516 to and rotatable with the drum 100 and controlled by a stationary cam 117. Each pusher has a tail 517 which engages a stationary cam 117, the tails of the pushers being maintained in engagement with the cam by leaf springs 518. It will be seen, therefore, that as the drum 100 rotates the pushers 116 will be caused to project from the periphery of the drum or to be retracted into the drum as desired. The pushers 116 move the strip material past the molding element 113 and deliver it into the path of a pusher 65 formed on the surface of the rotatable disc 66. Spaced converging guide element 122 is provided to ensure that the filter material is retained in its folded shape as it is removed from the drum 100, and an intermediate guide 121 (see Figure 15) is arranged to co-operate with the disc 66 to maintain the form of strip material. The strip material is gradually closed in towards the guide 121 whilst it is being moved by the pushers 65, the closing in operation being performed by the converging guides 122. The pushers 65 deliver the folded strip material into the spaces formed between the tobacco portions carried by the tobacco feeding means 52, and the operation of the machine is thereafter similar to that above described, the final forming of the strip material to the cross section of the rod being performed by the folding elements 74 as the paper web 70 is folded about the composite filler rod.

Referring to the modified construction shown in Figures 20 to 25, instead of mouthpiece portions of filter material being provided, the mouthpiece portions are formed from a tobacco which is of a different kind or quality from the remainder of the tobacco contained in the mouthpiece cigarettes. Tobacco is fed from a tobacco feeding mechanism shown diagrammatically by the reference 123. In this construction the tobacco feeding mechanism is divided into two parts, for example, by a partition 124, and to the right of the partition 124 there is placed the tobacco which is to form the body of the cigarette, whilst the tobacco which is to form the mouthpiece portion of the cigarette is placed to the left of the partition 124. Beneath the tobacco feeding mechanism 123 two tobacco feeding means 125 and 126 are arranged to move in a trough 127 and through paths which are substantially parallel, and the tobacco is showered on to the tobacco feeding means 125 and 126 in a manner such that the tobacco which is to form the body of the cigarette is received by the tobacco feeding means 125, while the tobacco which is to form the mouthpiece portion of the cigarette is received on the tobacco feeding means 126. The separating means 33 referred to above is again provided and operates to separate the tobacco on the tobacco feeding means 125 in the manner above described.

The tobacco carried by the tobacco feeding means 125 is separated into sections, which sections are received by a further tobacco feeding means 128 which carries the sections forwardly and delivers them to a still further tobacco feeding means 130.

For the sake of description let it be assumed that the length of the mouthpiece portion in a finished cigarette is to comprise one-fifth of the total length of the finished cigarette, and that the remaining four-fifths of the total length of the cigarette is comprised by the body portion of tobacco, that is, the tobacco which is received by the tobacco feeding means 125. In this case, the tobacco feeding means 125 moves at a speed which is approximately five times as fast as the speed at which the tobacco feeding means 126 is moved. By this means when the tobacco feeding means 125 and 126 pass from beneath the hopper, both means carry a tobacco filler of approximately the same cross section. The tobacco filler carried by the tobacco feeding means 125 is divided into sections by the separating means 33 as above described, and the tobacco filler carried by the tobacco feeding means 126 is divided into sections by the device shown in Figure 23. It will be appreciated that the separated tobacco sections which are formed from the tobacco filler carried by the tobacco feeding means 126 are to be only one quarter of the length of a tobacco section carried by the tobacco feeding means 128, and that these shorter sections are to be arranged so that they are aligned with the spaces between successive tobacco sections carried by the tobacco feeding means 128. Referring to Figure 23, the tobacco carried by the tobacco feeding means 126 is separated into lengths by a knife 327 which is carried by a rotatable drum 328, the knife 327 co-operating with a bridge 329 to sever the tobacco filler carried by the tobacco feeding means 126. The separated sections of tobacco are delivered to a further tobacco feeding means 129, which latter tobacco feeding means is moved at a speed which is approximately four times as fast as the speed at which the tobacco feeding means 128 is moving. The knife 327 is rotated so that the cutting edge of the knife moves with a speed which is substantially equal to that of the tobacco feeding means 129, and a movable gate 330 is arranged to hold up the tobacco section until it has been severed from the tobacco filler carried by the tobacco feeding means 126, and delivered on to the surface of the tobacco feeding means 129. The purpose of the gate 330 is to prevent the tobacco sections from being drawn out lengthwise, due to the fact that the tobacco feeding means 129 is moving at a faster speed than that at which the tobacco feeding means 126 is moving. The gate 330 is pivoted at 331 and is operated by a cam 332 which is arranged to raise the gate 330 to permit a tobacco section, when it is delivered on to the surface of the tobacco feeding means 129, to be moved forwardly. The knife 327 is operated in timed relation with the separating device 33, so that the operated tobacco sections on the tobacco feeding means 129 are in alignment with the spaces formed between successive tobacco sections carried by the tobacco feeding means 128 and also so that the number of sections severed by the devices 33 and 327 is the same in a given period of time.

The tobacco feeding means 128 is moved at a speed which is slightly in excess of the speed at which the tobacco feeding means 125 is moving, so as to ensure that the whole of the tobacco in each tobacco section carried by the tobacco feeding means 128 is below the desired mass. The tobacco feeding means 129 is moved at a speed which is approximately four times as fast as the speed at which the tobacco feeding means 128 is moving, in order to obtain the requisite spacing between the tobacco sections carried by the tobacco feeding means 129, to ensure that the tobacco sections are aligned with the spaces between the tobacco sections carried by the tobacco feeding means 128.

The tobacco feeding means 128 and 129 may be controlled by an adjustable driving device, such for example as that described in British Patent 467,999 so that the speed of the tobacco feeding means 128 and 129 may be adjusted relatively to one another should it be found that the portions of tobacco carried by the tobacco feeding means 129 are not accurately positioned with respect to the spaces opposite the tobacco portions carried by the tobacco feeding means 128.

The tobacco sections carried by the tobacco feeding means 128 and 129 respectively are delivered on to the surface of the further tobacco feeding means 130. This latter tobacco feeding means comprising an endless band which is gradually formed into a U shape as can be seen from Figures 21 and 24, and a separating bar 333 is provided to separate the sections from one another until they are completely on the tobacco feeding means 130, whereafter the band 130 passes the end of the separating bar 333, and the tobacco sections then roll towards each other, and the shorter tobacco sections which are to comprise the mouthpiece portions roll into the spaces between the longer tobacco portions. The tobacco feeding means 130 then delivers the alternate tobacco sections between side guides 135 and on to a still further tobacco feeding means 136 which conveys the tobacco sections forwardly and delivers them into one end of a confining passage as previously described, the tobacco sections being compacted lengthwise within the confining passage and removed therefrom by the paper web 70. The speed of the tobacco feeding means 136 may be the same as the speed of the tobacco feeding means 130, but in order to get this lengthwise compacting, the speed of the paper web must be slow enough relatively to the tobacco feeding means 136 to enable this to occur. The speed of the band 130 must, of course, be such as to enable spaces in the two rows of spaced tobacco sections to be sufficient to enable the sections to be brought into alignment. After being brought into alignment, however, the sections are then to be closed up and compacted lengthwise of their direction of movement by reducing their speed of travel whilst in the confining passage in the manner mentioned above.

It will be appreciated that with this construction it is not necessary to ensure that the mouthpiece portions are cut through the middle, and therefore, in such cases timing means such as those described previously may be unnecessary. In this construction, as in the previous construction, the band 130 moves at a speed which is greater than the speed of movement of the paper web 70 and the band 71, and the tobacco which is moved into the confining passage is at all points, or at substantially all points, below the desired mass. After the tobacco has been formed into a continuous filler rod of substantially the desired mass within the confining passage, it is removed by the paper web 70 and endless band 71, and is moved through the folding mechanism 74 which wraps the endless wrapper 70 about the continuous composite filler rod, and the composite cigarette rod so formed is severed in the manner previously described, the points of severance of the rod being illustrated by chain lines in Figure 26.

What I claim as my invention and desire to secure by Letters Patent is:

1. A method of manufacturing a continuous composite filler rod comprising alternate tobacco sections and mouthpiece portions, which rod is to be wrapped in a continuous wrapper and severed to form mouthpiece cigarettes, said method comprising feeding forwardly into one end of and through a confining passage mouthpiece portions and lengths of unwrapped tobacco in substantial axial alignment and axially separated, which lengths of tobacco at substantially all points are below the desired mass, and removing the tobacco and mouthpiece portions from the opposite end of the confining passage at a slower speed, whereby the reduction in speed in the confining passage tends to cause the unwrapped tobacco to build up to the walls of the confining passage and thereby increase its mass.

2. A method of manufacturing a continuous composite filler rod comprising alternate tobacco sections and mouthpiece portions, which rod is to be wrapped in a continuous wrapper and severed to form mouthpiece cigarettes, said method comprising feeding lengths of unwrapped tobacco and mouthpiece portions in substantial axial alignment and axially separated, and reducing the speed of movement of the tobacco and the mouthpiece portions within a confining passage so as to produce an axial compression which causes the tobacco portion to build up to the walls of the confining passage, said reduction in speed being sufficient to relatively displace axially adjacent mouthpiece portions and compressed tobacco portions into substantially abutting relation.

3. A method of manufacturing a continuous composite filler rod comprising alternate tobacco sections and mouthpiece portions, which rod is to be wrapped in a continuous wrapper and severed to form mouthpiece cigarettes, said method comprising feeding the tobacco sections in axial alignment and initially spaced apart a distance greater than the length of each of said mouthpiece portions, inserting said mouthpiece portions in said spaces, feeding forwardly into one end of and through a confining passage said mouthpiece portions and lengths of unwrapped tobacco in substantial axial alignment, which lengths of tobacco at substantially all points are below the desired mass, and removing the tobacco and mouthpiece portions from the opposite end of the confining passage at a slower speed, whereby the reduction in speed in the confining passage tends to cause the unwrapped tobacco to build up to the walls of the confining passage and thereby increase its mass, and also to relatively displace axially adjacent mouthpiece portions and compressed tobacco portions into substantially abutting relation.

4. In apparatus for manufacturing a continuous composite filler rod comprising alternate tobacco sections and mouthpiece portions, which rod is to be wrapped and severed to form mouthpiece cigarettes, the combination with a movable conveyor device for moving the tobacco sections and mouthpiece portions forwardly, of means to feed the alternate initially spaced tobacco sections and mouthpiece portions in the same general direction as and towards said conveyor device, but at a speed higher than that at which the conveyor device moves the tobacco sections and mouthpiece portions forwardly, and control means to confine the tobacco sections within the desired cross-sectional size in the region of the point at which the speed of the tobacco sections and mouthpiece portions changes so as to produce a change in momentum of the tobacco sections and mouthpiece portions for the purpose of compacting the tobacco sections to the desired extent and reducing spaces between the tobacco sections and the mouthpiece portions.

5. In apparatus for manufacturing a continuous composite filler rod comprising alternate tobacco sections and mouthpiece portions, which rod is to be wrapped and severed to form mouthpiece cigarettes, the combination with a movable conveyor device for moving the tobacco sections and mouthpiece portions forward, said conveyor device having a substantially smooth conveying surface, of means to feed the alternate initially spaced tobacco sections and mouthpiece portions in the same general direction as and towards said conveyor device, but at a speed higher than that at which the conveyor device moves the tobacco sections and mouthpiece portions forwardly, and control means cooperating with said conveyor device to form a passage to confine the tobacco sections within the desired cross-sectional size in the region of the point at which the speed of the tobacco sections and mouthpiece portions changes so as to produce a change in momentum of the tobacco sections and mouthpiece portions for the purpose of compacting the tobacco sections to the desired extent and reducing spaces between the tobacco sections and the mouthpiece portions.

6. In apparatus for manufacturing a continuous composite filler rod comprising alternate tobacco sections and mouthpiece portions, which rod is to be wrapped and severed to form mouthpiece cigarettes, the combination with a movable conveyor device for moving the tobacco sections and mouthpiece portions forwardly, said conveyor device having a substantially smooth conveying surface, of means to feed the alternate initially spaced tobacco sections and mouthpiece portions in the same general direction as and towards said conveyor device, but at a speed higher than that at which the conveyor device moves the tobacco sections and mouthpiece portions forwardly, and control means including an endless band disposed above said conveyor device and movable at substantially the linear speed of the latter, said control means and said conveyor device cooperating to form a passage to confine the tobacco sections within the desired cross-sectional size in the region of the point at which the speed of the tobacco sections and mouthpiece portions changes so as to produce a change in momentum of the tobacco sections and mouthpiece portions for the purpose of compacting the tobacco sections to the desired extent and reducing spaces between the tobacco sections and the mouthpiece portions.

7. In apparatus for forming cigarettes having tobacco sections and mouthpiece portions, the combination with a movable conveyor device for moving the tobacco sections and mouthpiece portions forwardly, of means to feed the alternate tobacco sections and mouthpiece portions in the same general direction as and towards said conveyor device, but at a speed higher than that at which the conveyor device moves the tobacco sections and mouthpiece portions forwardly, control means including an endless band disposed above said conveyor device and movable at substantially the linear speed of the latter, said control means and said conveyor device cooperating to form a passage to confine the tobacco sections within the desired cross-sectional size in the region of the point at which the speed of the tobacco sections and mouthpiece portions changes so as to produce a change in momentum of the tobacco sections and mouthpiece portions for the purpose of compacting the tobacco sections to the desired extent and reducing spaces between the tobacco sections and the mouthpiece portions, mechanism to apply a continuous web of wrapping material to the composite filler rod to form a continuous composite cigarette rod, cutting mechanism to sever the composite cigarette rod to form mouthpiece cigarettes, and means disposed adjacent said conveyor device and movable in timed relation with said cutting mechanism into the path of said mouthpiece portions to locate the latter for the cutting operation.

8. In apparatus for forming cigarettes having tobacco sections and mouthpiece portions, the combination with a movable conveyor device for moving the tobacco sections and mouthpiece portions forwardly, of means to feed the alternate tobacco sections and mouthpiece portions in the same general direction as and towards said conveyor device, but at a speed higher than that at which the conveyor device moves the tobacco sections and mouthpiece portions forwardly, control means including an endless band disposed above said conveyor device and movable at substantially the linear speed of the latter, said control means and said conveyor device cooperating to form a passage to confine the tobacco sections within the desired cross-sectional size in the region of the point at which the speed of the tobacco sections and mouthpiece portions changes so as to produce a change in momentum of the tobacco sections and mouthpiece portions for the purpose of compacting the tobacco sections to the desired extent and reducing spaces between the tobacco sections and the mouthpiece portions, mechanism to apply a continuous web of wrapping material to the composite filler rod to form a continuous composite cigarette rod, cutting mechanism to sever the composite cigarette rod to form mouthpiece cigarettes, and means disposed adjacent said conveyor device and movable in timed relation with said cutting mechanism into the path of said mouthpiece portions to locate the latter for the cutting operation, said band being positioned to engage and retain said mouthpiece portions in the position in which the latter are located by said last named means.

9. In apparatus for manufacturing a continuous composite filler rod comprising alternate tobacco sections and mouthpiece portions, which rod is to be wrapped and severed to form mouthpiece cigarettes, the combination with a movable conveyor device for moving the tobacco sections and mouthpiece portions forwardly, of means to feed the alternate tobacco sections and mouthpiece portions in the same general direction as and towards said conveyor device, but at a speed higher than that at which the conveyor device moves the tobacco sections and mouthpiece portions forwardly, control means to confine the tobacco sections within the desired cross-sectional size in the region of the point at which the speed of the tobacco sections and mouthpiece portions changes so as to produce a change in momentum of the tobacco sections and mouthpiece portions for the purpose of compacting the tobacco sections to the desired extent and reducing spaces between the tobacco sections and the mouthpiece portions, and means delivering tobacco to said first named means at a sufficient rate to enable tobacco sections of the desired mass to be produced therefrom, means for producing tobacco sections of low mass and spaced apart distances greater than the length of one of said mouthpiece sections, said first named means feeding the tobacco at such a speed that the tobacco fed thereby is at substantially all points below the desired mass.

10. In apparatus for manufacturing a continuous composite filler rod comprising alternate tobacco sections and mouthpiece portions, which rod is to be wrapped and severed to form mouthpiece cigarettes, the combination with a movable conveyor device for moving the tobacco sections and mouthpiece portions forwardly, of means to feed the alternate initially spaced tobacco sections and mouthpiece portions in the same general direction as and towards said conveyor device, but at a speed higher than that at which the conveyor device moves the tobacco sections and mouthpiece portions forwardly, separate devices for feeding tobacco toward said conveyor device, one of said separate devices feeding tobacco to form the tobacco sections and the other of said devices feeding tobacco of different quality to form the mouthpiece portions, and control means to confine the tobacco sections within the desired cross-sectional size in the region of the point at which the speed of the tobacco sections and mouthpiece portions changes so as to produce a change in momentum of the tobacco sections and mouthpiece portions for the purpose of compacting the tobacco sections to the desired extent and reducing spaces between the tobacco sections and the mouthpiece portions.

11. In apparatus for manufacturing a continuous composite filler rod comprising alternate tobacco sections and mouthpiece portions, which rod is to be wrapped and severed to form mouthpiece cigarettes, the combination with a movable conveyor device for moving the tobacco sections and mouthpiece portions forwardly, of means for feeding tobacco in a predetermined path, and means for separating the tobacco thus fed to form the same into spaced tobacco sections, said last named means comprising a rotatable member having a pair of cooperating spacing elements mounted for rotation therewith, at least one of said elements being movable relatively to said member during the rotation thereof, whereby the cooperating elements are separated one from the other for the purpose of producing the spaced tobacco sections.

12. In apparatus for manufacturing a continuous composite filler rod comprising alternate tobacco sections and mouthpiece portions, which rod is to be wrapped and severed to form mouthpiece cigarettes, the combination with a movable conveyor device for moving the tobacco sections and mouthpiece portions forwardly, of means for feeding tobacco in a predetermined path, and means for separating the tobacco thus fed to form the same into spaced tobacco sections, said last named means comprising a rotatable member having a pair of cooperating spacing elements mounted for rotation therewith, at least one of said elements being movable relatively to said member during the rotation thereof, whereby the cooperating elements are separated one from the other for the purpose of producing the spaced tobacco sections, and suction means cooperating with said separating means for removing loose tobacco from between the separated sections.

13. In apparatus for manufacturing a continuous composite filler rod comprising alternate tobacco sections and mouthpiece portions, which rod is to be wrapped and severed to form mouthpiece cigarettes, the combination with a movable conveyor device for moving the tobacco sections and mouthpiece portions forwardly, of means for feeding tobacco in a predetermined path, said means including a pair of conveyors having the delivery end of the first spaced from the receiving end of the second, stationary means bridging the gap between said conveyors, and rotary spacing means cooperating with said bridging means for separating the tobacco thus fed to form the same into spaced tobacco sections.

14. In apparatus for manufacturing a continuous composite filler rod comprising alternate tobacco sections and mouthpiece portions, which rod is to be wrapped and severed to form mouthpiece cigarettes, the combination with a movable conveyor device for moving the tobacco sections and mouthpiece portions forwardly, of means for feeding tobacco in a predetermined path, said means including a pair of conveyors having the delivery end of the first spaced from the receiving end of the second, stationary means bridging the gap between said conveyors, and means cooperating with said bridging means for separating the tobacco thus fed to form the same into spaced tobacco sections, said second conveyor moving at a faster speed than said first conveyor to effect further separation of said tobacco sections.

15. In apparatus for forming cigarettes having tobacco sections and mouthpiece portions, the combination with a movable conveyor device for moving the tobacco sections and mouthpiece portions forwardly, of means to feed the alternate tobacco sections and mouthpiece portions in the same general direction as and towards said conveyor device, but at a speed higher than that at which the conveyor device moves the tobacco sections and mouthpiece portions forwardly, control means including an endless band disposed above said conveyor device and movable at substantially the linear speed of the latter, said control means and said conveyor device cooperating to form a passage to confine the tobacco sections within the desired cross-sectional size in the region of the point at which the speed of the tobacco sections and mouthpiece portions changes so as to produce a change in momentum of the tobacco sections and mouthpiece portions for the purpose of compacting the tobacco sections to the desired extent and reducing spaces between the tobacco sections and mouthpiece portions, mechanism to apply a continuous web of wrapping material to the composite filler rod to form a continuous composite cigarette rod, cutting mechanism to sever the composite cigarette rod to form mouthpiece cigarettes, and means disposed adjacent said conveyor device and movable in timed relation with said cutting mechanism into the path of said mouthpiece portions to engage with the leading end faces of the mouthpiece portions and locate the latter for the cutting operation.

16. In apparatus for manufacturing a continuous composite filler rod comprising alternate tobacco sections and mouthpiece portions, which rod is to be wrapped and severed to form mouthpiece cigarettes, the combination with a movable conveyor device for moving the tobacco sections and mouthpiece portions forwardly, of means to feed the alternate tobacco sections and mouthpiece portions at spaced intervals in the same general direction as and towards said conveyor device, but at a speed higher than that at which the conveyor device moves the tobacco sections and mouthpiece portions forwardly, control means to confine the tobacco sections within the desired cross-sectional size in the region of the point at which the speed of the tobacco sections and mouthpiece portions changes so as to produce a change in momentum of the tobacco sections and mouthpiece portions for the purpose of compacting the tobacco sections to the desired extent and reducing spaces between the tobacco sections and the mouthpiece portions, mechanism to apply a continuous web of wrapping material to the composite filler rod to form a continuous composite cigarette rod, mechanism to apply adhesive to the continuous web at intervals corresponding to the positions at which the mouthpiece portions are located in the wrapped filler rod, and cutting mechanism to sever the composite cigarette rod to form mouthpiece cigarettes.

17. In apparatus for manufacturing a continuous composite filler rod comprising alternate tobacco sections and mouthpiece portions, which rod is to be wrapped and severed to form mouthpiece cigarettes, of means for feeding tobacco in a predetermined path, and means for separating the tobacco thus fed to form the same into spaced tobacco sections, said last named means comprising a rotatable member having a pair of cooperating spacing elements mounted for rotation therewith, at least one of said elements being movable relatively to said member during the rotation thereof, whereby the cooperating elements are separated one from the other for the purpose of producing the spaced tobacco sections, and suction means rendered operative by relative movement between the separating means and the rotatable member for removing loose tobacco from between the separated sections.

18. In apparatus for manufacturing a continuous composite filler rod comprising alternate tobacco sections and mouthpiece portions, which rod is to be wrapped and severed to form mouthpiece cigarettes, the combination with a movable conveyor device for moving the tobacco sections and mouthpiece portions forwardly, of means for feeding tobacco in a predetermined path, and means for separating the tobacco thus fed to form the same into spaced tobacco sections, said last named means comprising a rotatable drum provided with peripherally spaced radially extending blades, an interrupted sleeve generally rotatable with said drum but capable of relative movement with respect thereto, means for periodically effecting said movement, blades on said sleeve, each of which is adapted to cooperate with a corresponding blade on said drum by relative movement away from each other to separate the stream of tobacco being fed to produce said spaced tobacco sections.

19. In apparatus for manufacturing a continuous composite filler rod comprising alternate tobacco sections and mouthpiece portions, which rod is to be wrapped and severed to form mouthpiece cigarettes, the combination with a movable conveyor device for moving the tobacco sections and mouthpiece portions forwardly, of means for feeding tobacco in a predetermined path, and means for separating the tobacco thus fed to form the same into spaced tobacco sections, said last named means comprising a rotatable drum provided with peripherally spaced radially extending blades, an interrupted sleeve generally rotatable with said drum but capable of relative movement with respect thereto, means for periodically effecting said movement, blades on said sleeve, each of which is adapted to cooperate with a corresponding blade on said drum by relative movement away from each other to separate the stream of tobacco being fed to produce said spaced tobacco sections, peripherally spaced openings in said drum normally covered by the spaced portions of said interrupted sleeve but adapted to be uncovered upon the occurrence of relative movement between said sleeve and drum so that said openings communicate with the spaces between said blades, and means for applying suction to said openings, whereby loose tobacco may be removed from between the separated sections.

20. In apparatus for manufacturing a continuous composite filler rod comprising alternate tobacco sections and mouthpiece portions, which rod is to be wrapped and severed to form mouthpiece cigarettes, the combination of a pair of substantially parallel belt conveying devices, one of said devices feeding tobacco to form the tobacco sections and the other of said devices feeding tobacco of different quality to form the mouthpiece portions, means for delivering tobacco to said conveyors, spacing devices associated with each of said conveying devices for providing gaps in the streams of tobacco, the gaps in said streams alternating, a main belt conveyor arranged to receive alternating sections of tobacco from said parallel conveyors, a partition adjacent the receiving end of the main conveyor for keeping said sections separate as they are received upon said conveyor, said main conveyor belt being troughed, whereby said alternate sections of tobacco will move inwardly toward the center thereof as they pass beyond the end of said partition and will be aligned to form a substantially continuous stream to be made into a mouthpiece cigarette rod.

21. In apparatus for manufacturing a continuous composite filler rod comprising alternate tobacco sections and mouthpiece portions, which rod is to be wrapped and severed to form mouthpiece cigarettes, the combination of a pair of substantially non-coincident belt conveying devices, one of said devices feeding tobacco to form the tobacco sections and the other of said devices feeding tobacco of different quality to form the mouthpiece portions, means for delivering tobacco to said conveyors, spacing devices associated with each of said belt conveying devices for providing gaps in the streams of tobacco thereon, the gaps in said streams alternating, a main conveyor arranged to receive alternating sections of tobacco from said belt conveyors to form a substantially continuous stream to be made into a mouthpiece cigarette rod.

DESMOND WALTER MOLINS.